US009167530B2

(12) United States Patent
Shrivastava et al.

(10) Patent No.: US 9,167,530 B2
(45) Date of Patent: Oct. 20, 2015

(54) POWER SAVING MODES IN WIRELESS DEVICES

(71) Applicant: QUALCOMM Incorporated, San Diego, CA (US)

(72) Inventors: Sarvesh Shrivastava, Sunnyvale, CA (US); Sandip Homchaudhuri, San Jose, CA (US); Shu Du, Milpitas, CA (US); Zhanfeng Jia, Belmont, CA (US); Veerendra Bhora, Fremont, CA (US)

(73) Assignee: QUALCOMM Incorporated, San Diego, CA (US)

( * ) Notice: Subject to any disclaimer, the term of this patent is extended or adjusted under 35 U.S.C. 154(b) by 24 days.

(21) Appl. No.: 13/899,428

(22) Filed: May 21, 2013

(65) Prior Publication Data
US 2014/0153458 A1    Jun. 5, 2014

Related U.S. Application Data

(60) Provisional application No. 61/731,807, filed on Nov. 30, 2012.

(51) Int. Cl.
*H04W 52/00* (2009.01)
*H04W 52/02* (2009.01)
*H04W 76/04* (2009.01)

(52) U.S. Cl.
CPC ...... *H04W 52/0258* (2013.01); *H04W 52/0225* (2013.01); *H04W 76/048* (2013.01); *H04W 52/0229* (2013.01); *Y02B 60/50* (2013.01)

(58) Field of Classification Search
CPC .................................................. H04W 76/048
See application file for complete search history.

(56) References Cited

U.S. PATENT DOCUMENTS

| | | | |
|---|---|---|---|
| 7,295,827 B2 | 11/2007 | Liu et al. | |
| 7,310,535 B1 | 12/2007 | MacKenzie et al. | |
| 7,505,795 B1 | 3/2009 | Lim et al. | |
| 8,023,522 B2 | 9/2011 | Gobriel et al. | |
| 8,060,054 B1 | 11/2011 | Dinan et al. | |
| 8,412,287 B2 | 4/2013 | Qi et al. | |
| 2005/0209927 A1* | 9/2005 | Aaltonen et al. | 705/26 |
| 2006/0039320 A1 | 2/2006 | Kang et al. | |
| 2008/0043656 A1 | 2/2008 | Yoon et al. | |
| 2008/0151799 A1 | 6/2008 | Yousef et al. | |
| 2008/0234012 A1* | 9/2008 | Liu et al. | 455/574 |
| 2010/0254293 A1 | 10/2010 | Son et al. | |
| 2011/0019555 A1 | 1/2011 | Gotoh et al. | |
| 2012/0033584 A1 | 2/2012 | Corroy | |
| 2012/0106535 A1* | 5/2012 | Horiguchi | 370/345 |
| 2012/0238271 A1* | 9/2012 | Hanov | 455/436 |
| 2012/0258699 A1 | 10/2012 | Kim et al. | |
| 2013/0329576 A1 | 12/2013 | Sinha | |
| 2014/0153459 A1 | 6/2014 | Shrivastava et al. | |
| 2014/0153460 A1 | 6/2014 | Shrivastava et al. | |

* cited by examiner

*Primary Examiner* — John Blanton
(74) *Attorney, Agent, or Firm* — Arent Fox LLP

(57) ABSTRACT

Various aspects of apparatus for accessing a network through a wireless access point and methods of power savings for such apparatus include scheduling a sleep state interval, entering a sleep state at the beginning of the scheduled sleep interval, and buffering data during the sleep state for transmission following the sleep state.

43 Claims, 15 Drawing Sheets

POWER SAVING MODES IN WIRELESS DEVICES

CROSS-REFERENCE TO RELATED APPLICATION

This application claims the benefit of U.S. Provisional Application Ser. No. 61/731,807, filed on Nov. 30, 2012, which is expressly incorporated by reference herein in its entirety.

BACKGROUND

1. Field

The present disclosure relates generally to telecommunications, and specifically to power saving modes in wireless devices.

2. Background

The deployment of wireless local area networks (WLANs) in the home, the office, and various public facilities is commonplace today. These networks typically employ a wireless access point (AP) that connects a number of wireless stations (STAs) in a specific locality (e.g., home, office, public facility, etc.) to another network, such as the Internet or the like.

STAs that operate in an IEEE 802.11 compliant WLAN (i.e., Wi-Fi network) use carrier sensing multiple access (CSMA or CSMA-CA) to access the wireless channel. CSMA is a media access control (MAC) protocol that ensures that only one STA has access to the wireless channel at a time. Specifically, only one of the STAs is permitted to exchange data with the AP during any given interval. Meanwhile, the other STAs "listen" to the channel to determine if and when the channel is available. Thus, STAs often experience a substantial amount of "idle" time (e.g., wherein the STAs are not transmitting and/or receiving data) while connected to a network. To save power, many STAs are configured to enter into a "sleep" state when the idle time exceeds a threshold period. The sleep state is a low power mode in which transmitter, receiver, and/or other internal components are temporarily powered down.

The AP periodically broadcasts beacon frames to enable any STA within range to establish and/or maintain a connection with the wireless network. Each beacon frame includes a traffic indication map (TIM) specifying which STAs in the network, if any, have downlink data waiting in the AP's queue. Thus, to ensure that the STA does not miss any incoming data, it periodically wakes up from the sleep state to listen for beacon frames broadcast by the AP. The STA may also wake from the sleep state when it has uplink data for the AP in its queue. Once awaken to receive or transmit data, the STA will return to the sleep state only after it has been idle for another threshold period.

STAs that operate in an IEEE 802.11 compliant WLAN, as well as other similar devices, can experience significant power savings by entering into a sleep state when inactive. However, further power savings may be achieved with more efficient algorithms for controlling the sleep state of the devices.

SUMMARY

One aspect of an apparatus for accessing a network through a wireless access point includes a processing system configured to schedule a sleep state interval, enter a sleep state at the beginning of the scheduled sleep interval, and buffer data during the sleep state for transmission following the sleep state.

Another aspect of an apparatus for accessing a network through a wireless access point includes means for scheduling a sleep state interval, means for entering a sleep state at the beginning of the scheduled sleep interval, and means for buffering data during the sleep state for transmission following the sleep state.

An aspect of a method of power savings for an apparatus configured to access a network through a wireless access point includes scheduling a sleep state interval, entering a sleep state at the beginning of the scheduled sleep interval, and buffering data during the sleep state for transmission following the sleep state.

An aspect of a computer program product for an apparatus configured to access a network through a wireless access point includes a non-transitory computer-readable medium comprising code executable by one or more processors for scheduling a sleep state interval, entering a sleep state at the beginning of the scheduled sleep interval, and buffering data during the sleep state for transmission following the sleep state.

It is understood that other aspects of apparatus and methods will become readily apparent to those skilled in the art from the following detailed description, wherein various aspects of apparatus and methods are shown and described by way of illustration. As will be realized, these aspects may be implemented in other and different forms and its several details are capable of modification in various other respects. Accordingly, the drawings and detailed description are to be regarded as illustrative in nature and not as restrictive.

BRIEF DESCRIPTION OF THE DRAWINGS

Various aspects of apparatus and methods will now be presented in the detailed description by way of example, and not by way of limitation, with reference to the accompanying drawings, wherein.

DETAILED DESCRIPTION

Figure 1:
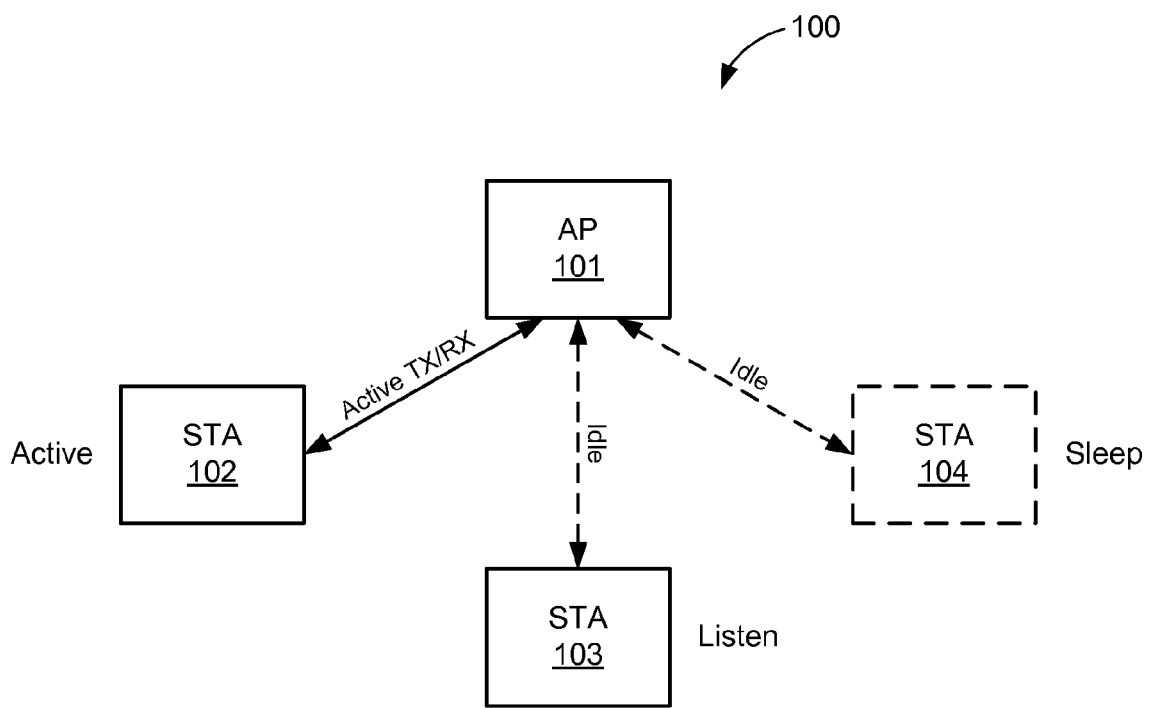
FIG. 1 is a conceptual diagram illustrating an example of a wireless local area network (WLAN)

Various concepts will be described more fully hereinafter with reference to the accompanying drawings. These concepts may, however, be embodied in many different forms by those skilled in the art and should not be construed as limited to any specific structure or function presented herein. Rather, these concepts are provided so that this disclosure will be thorough and complete, and will fully convey the scope of these concepts to those skilled in the art. The detailed description may include specific details However, it will be apparent to those skilled in the art that these concepts may be practiced without these specific details. In some instances, well known structures and components are shown in block diagram form in order to avoid obscuring the various concepts presented throughout this disclosure.

These concepts will now be presented with reference to various apparatus and methods. These apparatus and methods will be described in the following detailed description and illustrated in the accompanying drawings by various elements comprising blocks, modules, components, circuits, steps, processes, algorithms, and the like. These elements, or any portion thereof, either alone or in combinations with other elements and/or functions, may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. A processor may include a general purpose processor, a digital signal processor (DSP), an application specific integrated circuit (ASIC), a field programmable gate array (FPGA) or other programmable logic component, discrete gate or transistor logic, discrete hardware components, or any combination thereof, or any other suitable component designed to perform the functions described herein. A general-purpose processor may be a microprocessor, but in the alternative, the processor may be any conventional processor, controller, microcontroller, or state machine. A processor may also be implemented as a combination of computing components, e.g., a combination of a DSP and a microprocessor, a plurality of microprocessors, one or more microprocessors in conjunction with a DSP, or any other such configuration.

One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a non-transitory computer-readable medium. A non-transitory computer-readable medium may include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), static RAM (SRAM), dynamic RAM (DRAM), synchronous dynamic RAM (SDRAM); double date rate RAM (DDRAM), read only memory (ROM), programmable ROM (PROM), erasable PROM (EPROM), electrically erasable PROM (EEPROM), a general register, or any other suitable non-transitory medium for storing software.

The various interconnections within a processing system may be shown as buses or as single signal lines. Each of the buses may alternatively be a single signal line, and each of the single signal lines may alternatively be buses, and a single line or bus might represent any one or more of a myriad of physical or logical mechanisms for communication between elements. Any of the signals provided over various buses described herein may be time-multiplexed with other signals and provided over one or more common buses.

FIG. 1 is a conceptual diagram illustrating an example of a wireless network. In the detailed description that follows, the wireless network will be described as a WLAN, such as an IEEE 802.11 network. However, as those skilled in the art will readily appreciate, the various aspects described throughout this disclosure may be extended to other networks employing various standards or protocols including, by way of example, Bluetooth, HiperLAN (a set of wireless standards, comparable to the IEEE 802.11 standards, used primarily in Europe), and other technologies used in wide area networks (WAN)s, WLANs, personal area networks (PAN)s, or other suitable networks now known or later developed. The various aspects presented throughout this disclosure may be applicable to any suitable wireless network regardless of the coverage range and the wireless access protocols utilized.

The wireless network may support any number of apparatuses. An apparatus may be any suitable wireless device capable of operating in a wireless environment, such as an AP or a STA operating in a IEEE 802.11 compliant network. An AP is generally a fixed terminal that provides backhaul services to STAs within its coverage region, however, the AP point may be mobile in some applications. A STA, which may be fixed or mobile, utilizes the backhaul services of an AP to connect to a network, such as the Internet. Examples of a STA include, but are not limited to, a cellular phone, a smart phone, a laptop computer, a desktop computer, a personal digital assistant (PDA), a personal communication system (PCS) device, a personal information manager (PIM), personal navigation device (PND), a global positioning system, a multimedia device, a video device, an audio device, or any other suitable wireless apparatus requiring the backhaul services of an AP. A STA may also be referred to by those skilled in the art as a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, user equipment (UE), or some other suitable terminology. An AP may also be referred to as a base station, a base transceiver station, a radio base station, a radio transceiver, a transceiver function, or any other suitable terminology. The various concepts described throughout this disclosure are intended to apply to all suitable wireless apparatus regardless of their specific nomenclature.

Turning to FIG. 1, the WLAN 100 is shown with an AP 101 and a number of wireless STAs 102-104 within the coverage region of the AP 101. Although only three STAs 102-104 are shown in FIG. 1 for simplicity, it is to be understood that the WLAN 100 may include any number of STAs. The AP 101 provides backhaul services to STAs over a wireless channel. The STAs 102-104 gain access to the wireless channel using a carrier sensing protocol. However, as those skilled in the art will appreciate, the various concepts described throughout this disclosure are equally applicable to any suitable apparatus regardless of the protocol or standard used.

Each of the STAs 102-104 can operate in an "active" state, a "listen" state, and a "sleep" state while connected to the AP 101. As shown in FIG. 1, the STA 102 is in the active state, the STA 103 is in the listen state, and the STA 104 is in the sleep state. Specifically, in the active state, the STA 102 may be actively exchanging (e.g., transmitting and/or receiving) data with the AP 101. In other words, the transmitters and/or receivers of the STA 102 are powered on and in active use. While in the listen state, the STA 103 is "listening" to the channel for beacon frames, incoming data, and/or to detect a clear channel (e.g., in order to transmit data). In other words, the transmitters and/or receivers of the STA 103 are powered on, but idle. While in the sleep state, the STA 104 is neither transmitting on, receiving on, nor listening to the channel. The sleep state is a low power mode wherein one or more components (e.g., the transmitters and/or receivers) of the STA are powered down.

Typically, only one of the STAs 102-104 is permitted to transmit and/or receive data with the AP 101 at a time. Thus, at any given time, one of the STAs 102-104 may be in the active state (STA 102) while the other STAs are in either the listen state (STA 103) or the sleep state (STA 104). The AP 101 periodically broadcasts beacon frames, which may include management information to enable the STAs 102-104 to maintain a connection with the WLAN 100. Each beacon frame may also include a traffic indication map (TIM) specifying whether one or more of the STAs 102-104 has downlink data queued in the AP 101. Assuming the channel is clear, a STA having downlink data may then transmit a poll request to the AP 101 to transmit the data in the AP's queue.

Power saving is greatest when a STA is in the sleep state. However, the STA is unable to receive beacon frames or data while operating in the sleep state. Thus, for some embodiments, the STAs 102-104 may alternate between the listen state and the sleep state in a manner that improves power savings without undue risk of missing incoming data. More specifically, as described in more detail below, each of the STAs 102-104 can determine when, and how long, to operate in a sleep state based on the likelihood that it will receive incoming data (e.g., beacon frames and/or other data transmitted by the AP 101).

Figure 2:
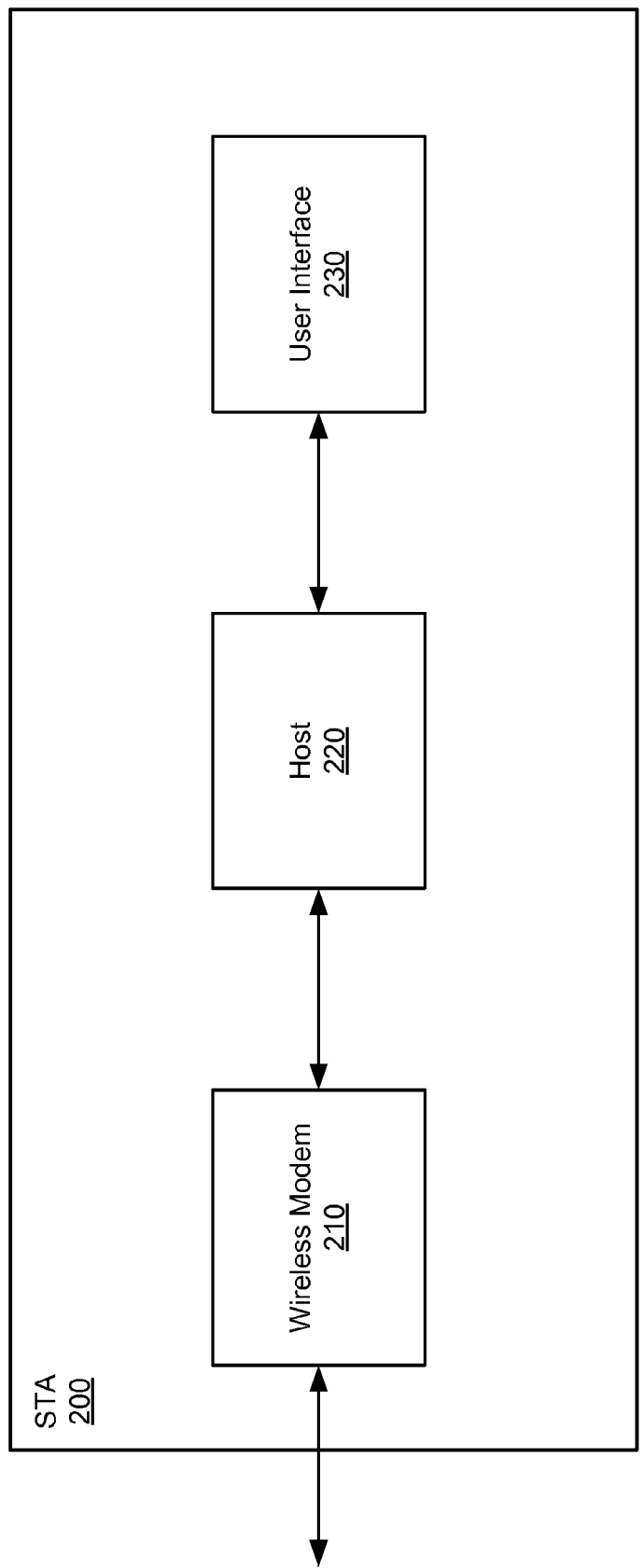
FIG. 2 is a block diagram illustrating an example of a wireless station (STA)

FIG. 2 is a functional block diagram illustrating an example of a STA. The STA 200 is shown with a wireless modem 210, a host 220, and a user interface 230. A "wireless modem" shall be construed broadly to mean any entity capable of providing or supporting a connection to a network through the AP. The wireless modem 210 may be implemented with a protocol stack. The protocol stack may include a physical layer for transmitting and receiving data in accordance with the physical and electrical specifications of the wireless channel, a data link layer for managing access to the wireless channel, a network layer for managing source to destination data transfer, a transport layer for managing transparent transfer of data between end users, and any other layers necessary or desirable for establishing or supporting a connection to a network. Alternatively, one or more of these protocol layers may be implemented remote from the wireless modem. By way of example, the wireless modem may include the physical layer, and possibly the lower portion of the data link layer. The higher layers may be implemented elsewhere in the STA 200.

The host 220 shall be construed broadly to include any entity capable of providing a data source and/or data sink. One or more software applications, or other circuitry, resident on the host 220 may enable a user to transmit, receive, and/or process data through a user interface 230. For the purpose of this disclosure, the term "data" shall be construed broadly to include voice, text, audio, video, and all other data generated or received by a user. The term "data" does not include information to control the STA, such as, by way of example, the information contained in the beacon frames transmitted by the AP. The user interface 230 may include a keypad, display, speaker, microphone, joystick, and/or any other combination user interface components that enable the user to interact with the host 220.

Figure 3:
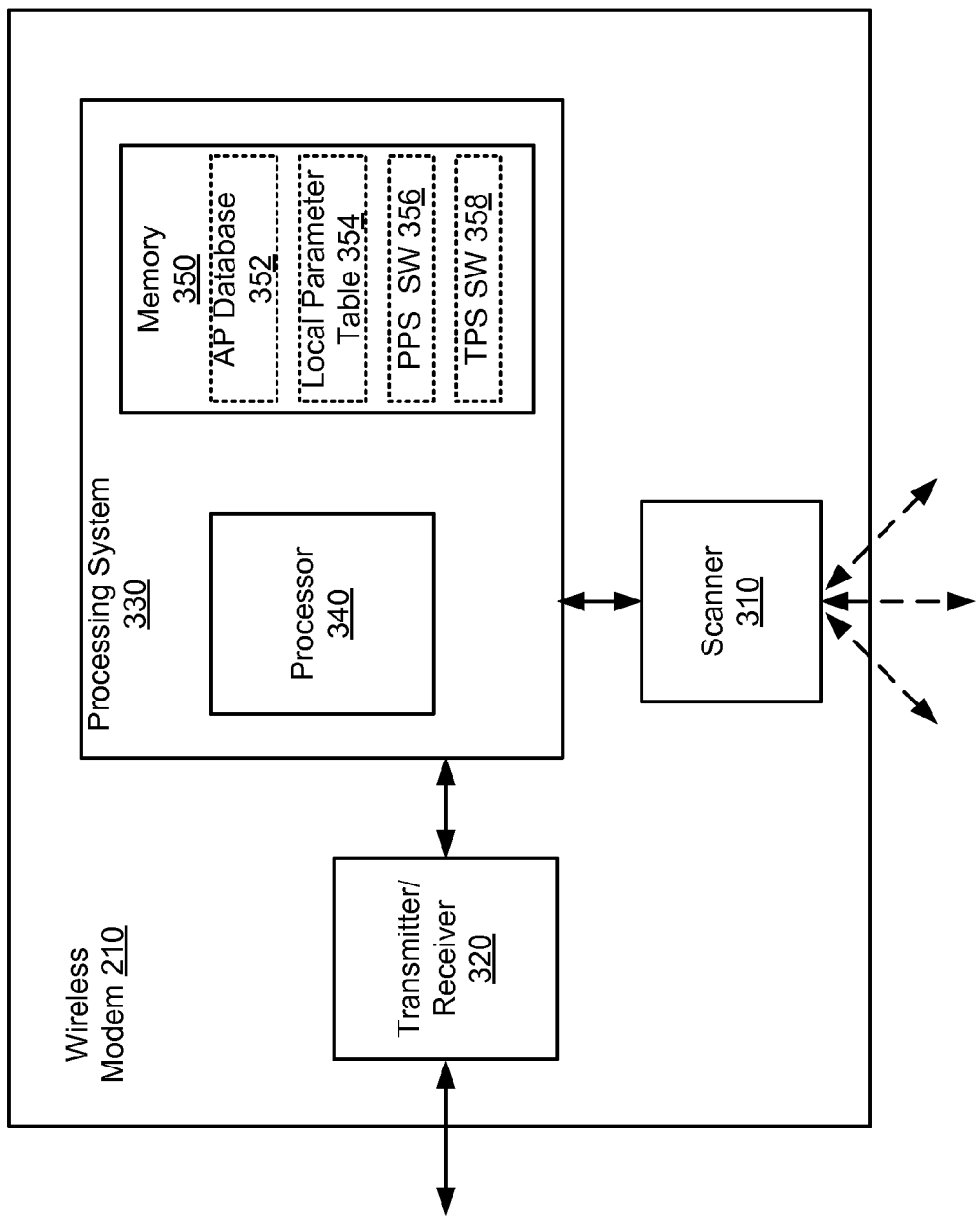
FIG. 3 is a block diagram illustrating an example of a wireless modem in a STA.

FIG. 3 is a functional block diagram illustrating an example of a wireless modem 210 in a STA. The wireless modem 210 provides a means for scheduling a sleep state interval, means for entering a sleep state at the beginning of the scheduled sleep interval, and means for waking up from the sleep state. As described in greater detail below, the STA may waken from the sleep state either at the end of the scheduled sleep state interval or earlier under certain circumstances.

The wireless modem 210 is shown with a scanner 310 and a transmitter/receiver circuit ("transceiver") 320. The scanner 310 may be used to scan the surrounding environment to detect and identify nearby APs and/or peer STAs (e.g., when operating in a peer-to-peer mode). For some embodiments, the scanner 310 may search for APs by listening for beacon frames broadcast by APs within wireless range. The transceiver 320 may then be used to wirelessly transmit and receive data with discovered APs.

The wireless modem 210 is also shown with a processing system 330. The processing system 304 is shown separate from the scanner 310 and the transceiver 320, however, as those skilled in the art will readily appreciate, the scanner 310 and/or the transceiver 320, or any portion thereof, may be integrated into the processing system 330. The processing system 330 may be implemented with a bus architecture which includes any number of interconnecting buses and bridges. The bus links together various circuits in the processing system 330 including a processor 340 and memory 350. The bus may also link various other circuits such as timing sources, peripherals, voltage regulators, power management circuits, and the like, which are well known in the art, and therefore, will not be described any further.

The processor 340 is responsible for managing the bus and general processing, including the execution of software stored in memory 350. The memory 350 may include an AP database 352 that can be used as a local cache to store the MAC addresses or other identifying information of a plurality of APs, the location coordinates of such APs, beacon frame intervals, supported data rates, and/or other suitable location or configuration information pertaining to any discovered APs. For some embodiments, each entry of the AP database 352 includes an access point field to store the name of the associated AP, a BSSID field to store the MAC address of the AP, a beacon interval field to store the time duration between successive beacon frame transmissions, and a data rate field to store one or more supported data transmission rates of the AP. The memory 350 may also include a local parameter table 354 that can be used to store one or more local operating parameters of the STA. As described in greater detail below, the local parameter table 354 may include an idle timer (IDL), an idle threshold value ($IDL_{TH}$), a current sleep interval ($T_S$), maximum and minimum sleep interval values ($T_{MAX}$ and $T_{MIN}$, respectively), a burst traffic interarrival time ($T_{IAT}$), a Wireless link "goodput" estimation (WLG), and any other suitable parameters, or any combination thereof.

The memory 350 may also include a non-transitory computer-readable medium (e.g., one or more nonvolatile memory elements) which may include any number of software modules. Each software module includes a set of instructions that when executed by the processor 340 cause the processing system 330 to perform various functions. In this example, the non-transitory computer-readable medium 350 is shown with a progressive power save (PPS) software module 356 that provides a means for autonomously alternating between a listen state and the sleep state during a time period in which no traffic is detected from the AP, and a means for progressively increasing the sleep state interval for at least a portion of the time period. The non-transitory computer-readable medium is also shown with a throughput-based power save (TPS) software module 358 that provides a means for scheduling one or more sleep state intervals during a time period based on one or more wireless transmission parameters, and a means for entering the sleep state at the beginning of each of the one or more scheduled sleep state intervals. The non-transitory computer-readable medium may also include other software modules (not shown) that enable the processor 340 to control the general operation of the wireless modem and communicate with the host.

Several embodiments of the wireless modem 300 may include both a PPS software module and a TPS software module. For some embodiments, both software modules may be enabled to perform various aspects of a sleep algorithm. In other embodiments, one of the software modules may be enabled, while the other software module remains dormant. The software module that is dormant may be activated later in the field, or at the factory, to implement, for example, an upgrade in services. In some embodiments, only one of the two software modules may be loaded into memory 350. By way of example, the STA may be PPS capable only. Alternatively, the STA may be TPS capable only. In the case of a STA with only one of the two software modules loaded into memory 350 at the factory, the STA may or may not be capable of being programmed later in the field, or at the factory, with the other software module. The actual implementation of the wireless modem 300 will depend on a variety of factors including consumer demand, performance parameters, pricing, and other relevant factors.

The PPS software module 356 may be executed by the processor 340 to periodically place the STA in a sleep state while progressively adjusting the duration of a sleep interval. For example, the PPS software module 356 as executed by processor 340 may place the STA in a sleep state upon termination of an active data exchange between the STA and an AP (e.g., after a brief idle time), and may progressively increase the duration of the sleep interval. Specifically, the PPS software module 356 may cause the processor 340 to deactivate or "power down" the transceiver 320, including any additional components that may be used in the transmission and/or reception of data. The processor 340, in executing the PPS software module 356, may then periodically wake up the STA from the sleep state, after a sleep interval $T_S$ has expired, to listen for incoming data and/or beacon frames. When woken up, the STA may be placed in the listen state for a relatively short idle period (e.g., ~5 ms). If no incoming data is received (other than a beacon frame) during the idle period, the processor 340 may once again place the STA in a sleep state (e.g., by deactivating the transceiver 320).

For some embodiments, the PPS software module 356 as executed by processor 340 increases the sleep interval $T_S$ each time the STA is placed back in the sleep state without having received any incoming data. On the other hand, if the STA receives incoming data upon waking up from a sleep state, the sleep interval $T_S$ is reset to a minimum sleep value $T_{MIN}$ (e.g., ~5 ms) before repeating the progressive power save operation. This is to ensure that the STA does not miss subsequent data (e.g., assuming a pause in data transmission). The longer the STA goes without receiving additional data, the less likely it is that the STA will have subsequent data waiting in the AP's queue. Accordingly, the sleep interval $T_S$ may be increased with each successive iteration.

For some embodiments, the PPS software module 356 as executed by processor 340 determines an initial value for the sleep interval $T_S$ based on an interarrival time ($T_{IAT}$) for burst data transmitted between the STA and an AP. The interarrival time $T_{IAT}$ corresponds to the time between data bursts, and may thus depend on the end-to-end round trip time (RTT) of data transmitted from the STA to the AP, and vice-versa. The processor 340, in executing the PPS software module 356, may estimate the burst data interarrival time $T_{IAT}$ associated with the network by observing the pattern of data between the STA and the AP over a period of time. The estimated $T_{IAT}$ value may be stored in the local parameter table 344 and updated periodically. Because the STA is unlikely to receive a subsequent burst of data before the interarrival time expires, the initial $T_S$ value following an active data exchange may be set to the $T_{IAT}$ value (i.e., $T_S=T_{IAT}$).

Figure 4:
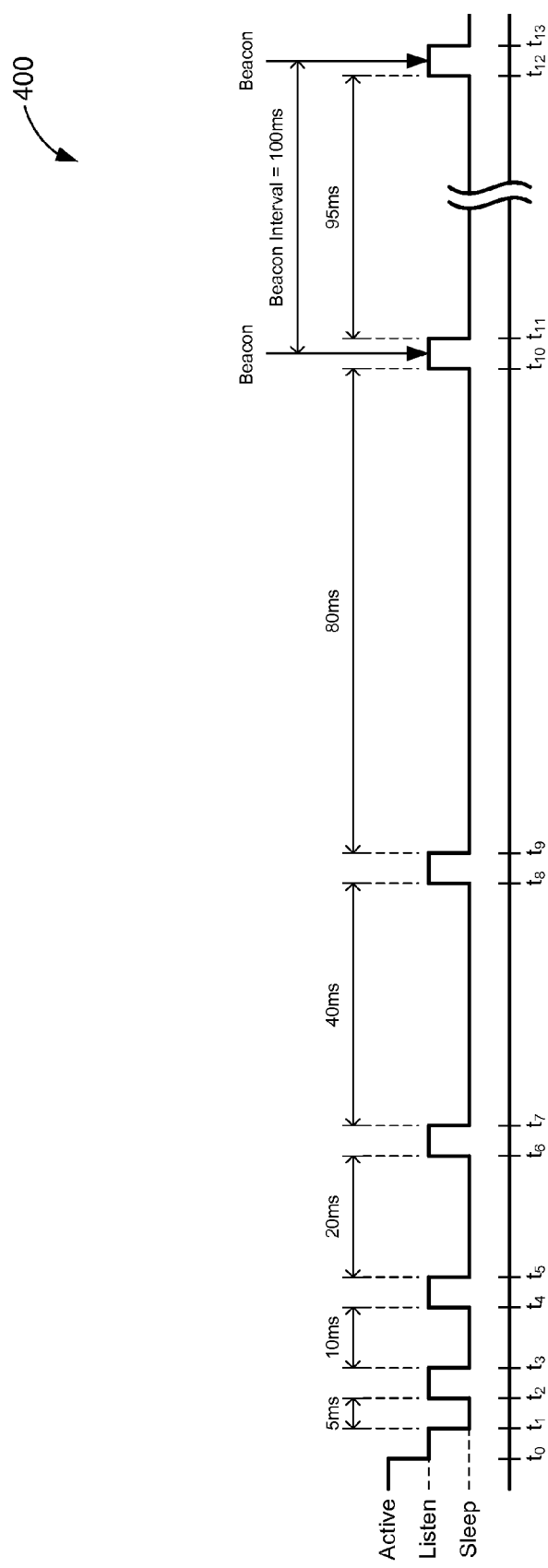
FIG. 4 is a timing diagram illustrating an example of a progressive power save operation in a STA.

FIG. 4 is a timing diagram illustrating an example of a progressive power save operation 400. The PPS operation 400 may be implemented by any of the STAs 102-104 of FIG. 1. Specifically, the PPS operation 400 is triggered immediately following an active data exchange (at time $t_0$). The STA continues to listen for incoming data for the duration of a threshold idle period $IDL_{TH}$ (e.g., 5 ms) before entering the sleep state (from times $t_0$-$t_1$). The threshold idle period $IDL_{TH}$ may correspond to a minimum amount of time needed to detect and/or receive incoming data or beacon frame. For some embodiments, the threshold idle period $IDL_{TH}$ may be slightly longer than the minimum amount of time needed to receive an incoming beacon (e.g., to ensure complete reception of the beacon frame).

During the first sleep state iteration, the STA is asleep for a minimum sleep interval $T_{MIN}$ (e.g., 5 ms) before waking up to listen for more incoming data (from times $t_1$-$t_2$). If no data is received after waiting another threshold idle period $IDL_{TH}$ (from times $t_2$-$t_3$), the STA returns to the sleep state (at time $t_3$). This time, the STA remains asleep for an even longer duration (e.g., 10 ms) than the previous sleep interval. Specifically, in the example shown, the current sleep interval $T_S$ is twice the duration of the previous sleep interval. This process of waking up briefly to listen for incoming data and then doubling the sleep interval is repeated until the maximum sleep value $T_{MAX}$ is reached (at time $t_{11}$). Specifically, the maximum sleep value $T_{MAX}$ (e.g., 95 ms) may substantially coincide with an AP's beacon frame interval (e.g., 100 ms) to ensure that the STA is awake long enough (e.g., 5 ms) to receive the beacon frames broadcast by the AP.

As shown in this example, the sleep interval $T_S$ starts off relatively small, and ramps up to the maximum sleep value $T_{MAX}$ with successive iterations. This is because there is a high probability that the first idle period ($t_0$-$t_1$), immediately following an active data exchange, is the result of a temporary break or pause in data transmission. However, as time progresses and no incoming data is detected, it becomes less and less likely that the STA will receive any subsequent data. Thus, the STA may remain in the sleep state for longer and longer periods of time. The more time the STA spends in the sleep state, the more power it will save. For example, during the first 200 ms immediately following the active data exchange ($t_0$), a STA implementing the PPS operation 400 will have spent 170 ms in the sleep state and only 30 ms in the listen state. In comparison, a typical STA would have spent the entire 200 ms immediately following the active data exchange ($t_0$) in the listen state before entering the sleep state for the first time.

Note that the sleep interval $T_S$ is shown to be doubled for exemplary purposes only. However, similar, if not better, results may be achieved by progressively increasing the sleep interval $T_S$ according to other schemes as well (e.g., by progressively incrementing the sleep interval $T_S$). Furthermore, although the sleep interval $T_S$ is increased each time the STA reenters the sleep state, the scheduling of its wake-up times (e.g., $t_2$-$t_3$, $t_4$-$t_5$, $t_6$-$t_7$, etc.) may still be configured to substantially coincide with the broadcast of beacon frames by the AP. This is to ensure that the STA does not miss any beacon frames from the AP.

Figure 5A:
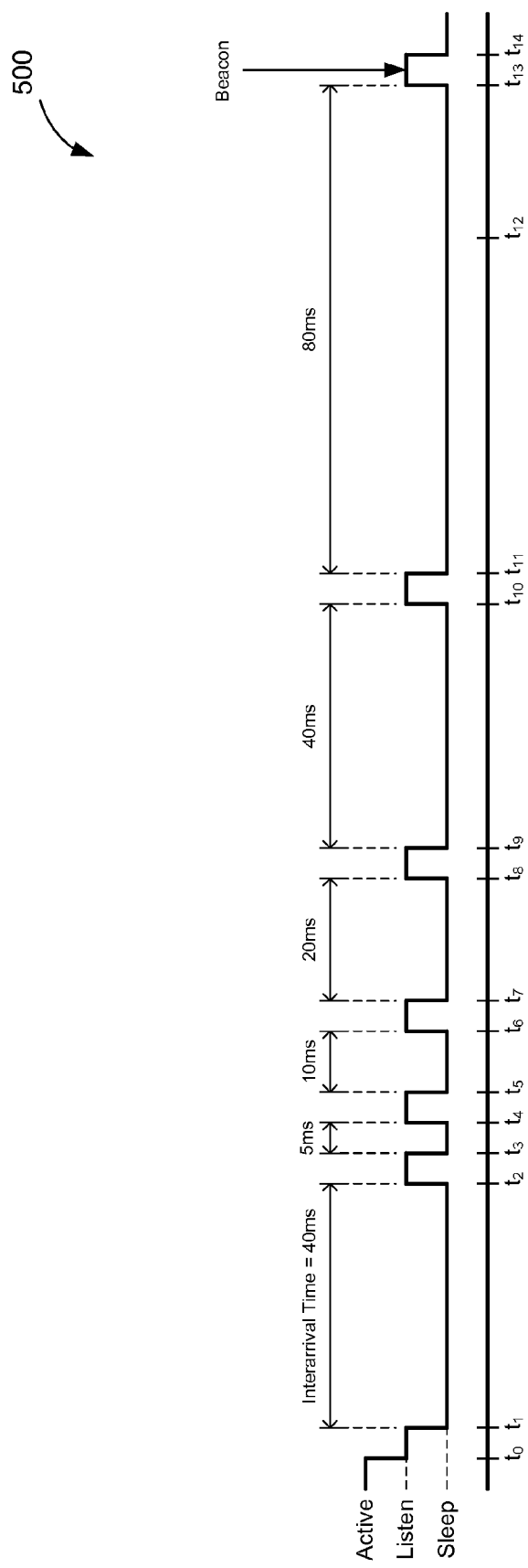
FIGS. 5A-5B are timing diagrams illustrating other examples of a progressive power save operation in a STA.

FIG. 5A is a timing diagram illustrating another example of a progressive power save operation 500A. The PPS operation 500A may be implemented by any of the STAs 102-104, of FIG. 1. Specifically, the PPS operation 500A is triggered at time $t_0$, immediately following an active data exchange. The STA continues to listen for incoming data for the duration of a threshold idle period $IDL_{TH}$ (e.g., 5 ms), before entering the sleep state (from times $t_0$-$t_1$). During the first sleep state iteration, the STA is asleep for the duration of an estimated interarrival time $T_{IAT}$. As discussed above, the interarrival time $T_{IAT}$ represents the average wait period between successive bursts of data detected at the STA. Thus, because the wireless channel is presumably idle during the interarrival time $T_{IAT}$, the STA may be placed in a sleep state to conserve energy.

The probability of receiving incoming data greatly increases once the interarrival time $T_{IAT}$ expires. Therefore, the next sleep interval $T_S$ (from times $t_3$-$t_4$), is set to the minimum sleep value $T_{MIN}$ (e.g., 5 ms) to ensure that the STA wakes up in time to receive a subsequent burst of data from the AP. Each successive sleep interval $T_S$ may then be increased (e.g., doubled) until the maximum sleep value $T_{MAX}$ is reached (i.e., until $T_S$=$T_{MAX}$). For example, after the first sleep interval (from times $t_1$-$t_2$), wherein $T_S$=$T_{IAT}$, the remainder of the PPS operation 500A may look substantially similar to the PPS operation 400, described above with respect to FIG. 4.

Figure 5B:
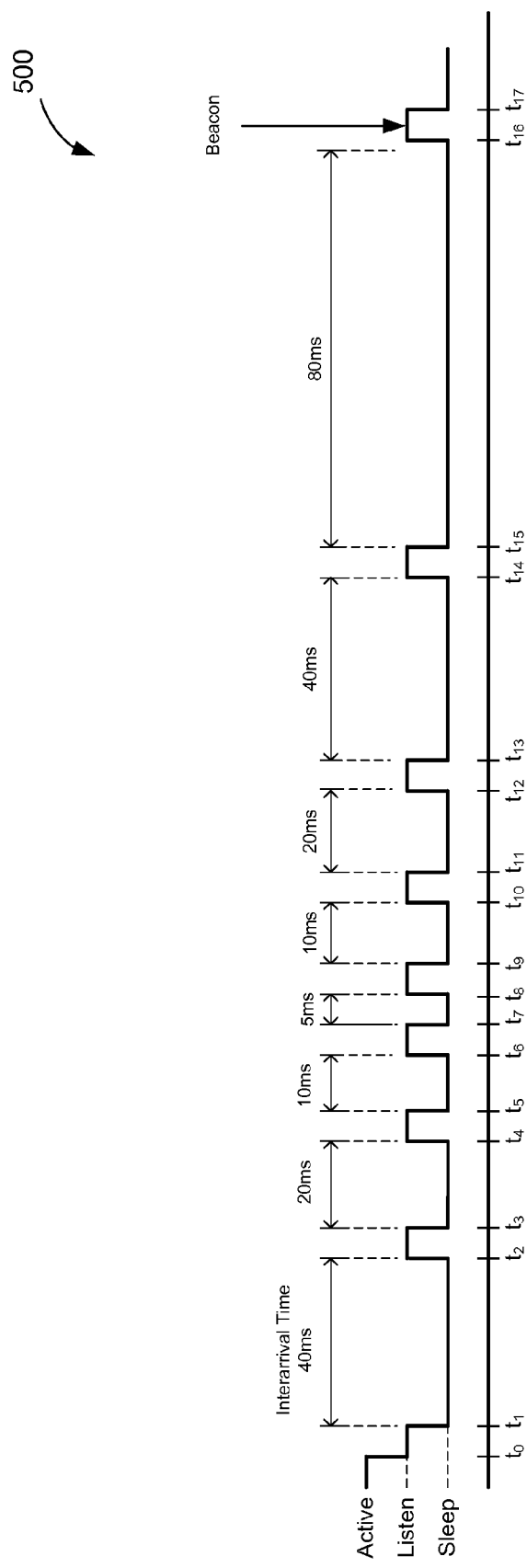

FIG. 5B is a timing diagram illustrating another example of a progressive power save operation 500B which can be implemented by any of the STAs 102-104, of FIG. 1. Specifically, in this example. the PPS operation 500B is triggered at time $t_0$, immediately following an active data exchange. The STA continues to listen for incoming data for the duration of a threshold idle period $IDL_{TH}$ (e.g., 5 ms), before entering the sleep state (from times $t_0$-$t_1$). During the first sleep state iteration, the STA is asleep for the duration of an estimated interarrival time $T_{IAT}$ (from times $t_1$-$t_2$). However, in this example, each successive sleep state iteration is progressively decreased until the minimum sleep value $T_{MIN}$ (e.g., 5 ms) is reached.

Referring to FIG. 5B, the STA wakes up (from times $t_2$-$t_3$) when the interarrival time $T_{IAT}$ expires. If no data is received after waiting another threshold idle period $IDL_{TH}$ (from times $t_2$-$t_3$), the STA returns to the sleep state (at time $t_3$). This time, the STA remains asleep for a shorter duration (e.g., 20 ms) than the previous sleep interval. Specifically, in the example shown, the current sleep interval $T_S$ is half the duration of the previous sleep interval. This process of waking up briefly to listen for incoming data and then halving the sleep interval is repeated until the minimum sleep value $T_{MIN}$ is reached (at time $t_7$). The remainder of the PPS operation 500B may look substantially similar to the PPS operation 400, described above with respect to FIG. 4.

Figure 6:
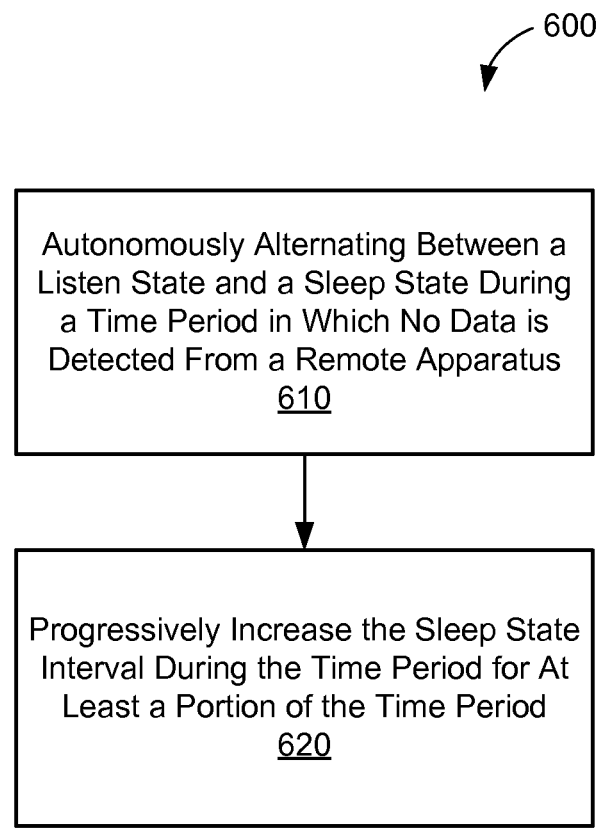
FIG. 6 is a flow chart illustrating an example of a progressive power save operation in a STA.

FIG. 6 is an illustrative flow chart illustrating an example of a progressive power save operation 600. As described above, the present embodiments may allow STAs to increase the frequency and duration with which they enter and remain in a sleep state. It is to be understood that the PPS operation 600 may be implemented by any STA connected to a wireless network (e.g., any of the STAs 102-104 shown in FIG. 1). A STA initiates the PPS operation 600 by listening for incoming data frames immediately following an active data exchange with an AP (610). For example, once the STA no longer detects incoming data, it may continue to listen to the channel for a brief duration for subsequent transmission of data and/or beacon frames.

If the STA has been idle for the duration of a threshold idle period, the STA then enters the sleep state (620). For example, the STA may deactivate or power down its transceiver, including any other components used in the transmission and/or reception of data. However, the STA will periodically wake up from the sleep state to listen for incoming data traffic and/or beacon frames (630). For example, while in the sleep state the STA may be unable to receive incoming data and/or beacon frames containing TIM messages notifying the STA of potential incoming data. Thus, the STA is configured to periodically wake up and listen to the channel to ensure that it does not miss incoming data.

The STA can then adjust the sleep duration each time it returns to a sleep state (640). For example, the duration of the sleep interval may be progressively increased each time the STA returns to the sleep state without having received any incoming data from the AP (e.g., not including beacon frames). In this manner, the STA may enter the sleep state more often, and remain in the sleep state for longer, while also ensuring that it does not miss beacon frames and/or incoming data. This, in turn, allows the STA to achieve greater power savings without degrading throughput.

Figure 7:
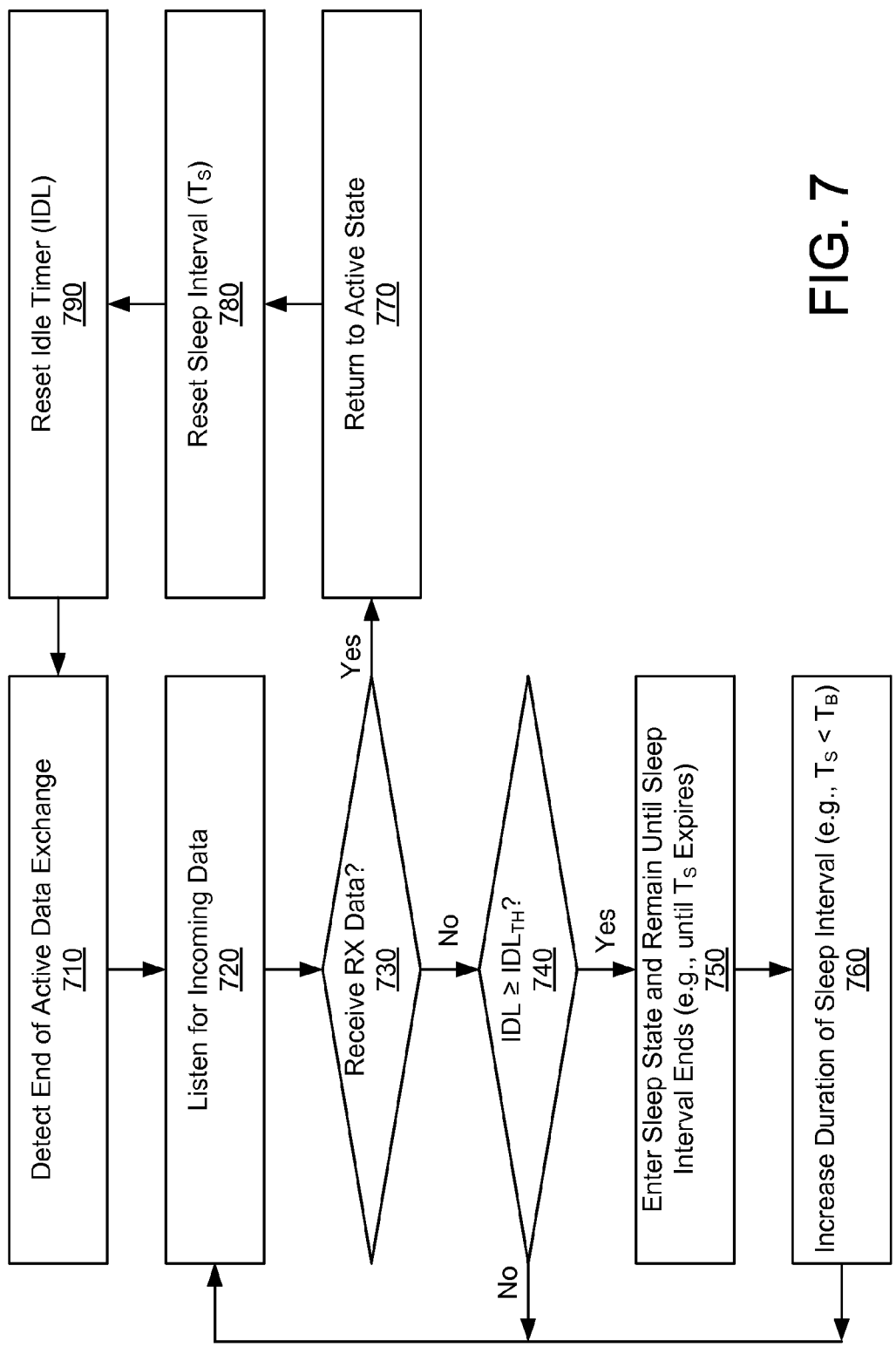
FIG. 7 is a flow chart illustrating a more detailed example of a progressive power save operation in a STA.

FIG. 7 is a flow chart illustrating a more detailed example of a progressive power save operation 700. A STA initiates the PPS operation 700 by first detecting the end of an active data exchange (710). For example, the STA's transceivers may be idle after actively transmitting and/or receiving data. The STA continues to listen to the channel for subsequent data and/or beacon frames (720). At this time, the STA may initiate an idle timer IDL that records how long the STA has been listening to the channel without receiving any incoming data traffic. Specifically, the STA may remain in the idle state, and continue to listen to the channel (720), as long as no incoming (RX) data is received (730) and the idle timer IDL has not reached the threshold idle limit $IDL_{TH}$ (740). As discussed above, the threshold idle limit $IDL_{TH}$ may correspond to a minimum amount of time needed to detect and/or receive an incoming RX data or a beacon frame.

If no RX data is received (730) and the idle timer IDL reaches the threshold idle limit $IDL_{TH}$ (740), the STA may enter the sleep state and remain asleep for the duration of a sleep interval $T_S$ (750). For some embodiments, the sleep interval $T_S$ is initially set to a minimum sleep value ($T_{MIN}$). For example, the minimum sleep value $T_{MIN}$ may correspond to a minimum amount of time needed to transition from the listen state to the sleep state, and back. For other embodiments, the sleep interval $T_S$ may be initially set to an estimated interarrival time $T_{IAT}$ of burst data from the AP to the STA. For example, as discussed above, it may be assumed that the STA may not receive a subsequent burst of data before the interarrival time $T_{IAT}$ expires.

The STA may then adjust the sleep interval $T_S$ to be applied the next time the STA enters the sleep state (760). For example, the sleep interval $T_S$ may be progressively increased each time the STA returns to the sleep state. However, as discussed in greater detail below with respect to FIG. 7, the sleep interval $T_S$ may be capped at a maximum sleep value $T_{MAX}$, which is less than a beacon interval $T_B$ (i.e., the time between transmission of beacon frames by the AP). When the current sleep interval expires, the STA wakes up from the sleep state to listen once again for RX data (720). Then, if no RX data is received (730) before the threshold idle limit is reached $IDL_{TH}$ (740), the new sleep interval $T_S$ will be applied when the STA reenters the sleep state (750).

If the STA detects RX data on the channel before the idle threshold $IDL_{TH}$ is reached (730), it may return to an active state to receive the RX data (770). Upon returning to the active state, the STA may reset both the sleep interval $T_S$ (780) and the idle timer IDL (790). Once the STA has finished actively exchanging data with the AP, the PPS operation 700 can then be restarted (610).

Figure 8:
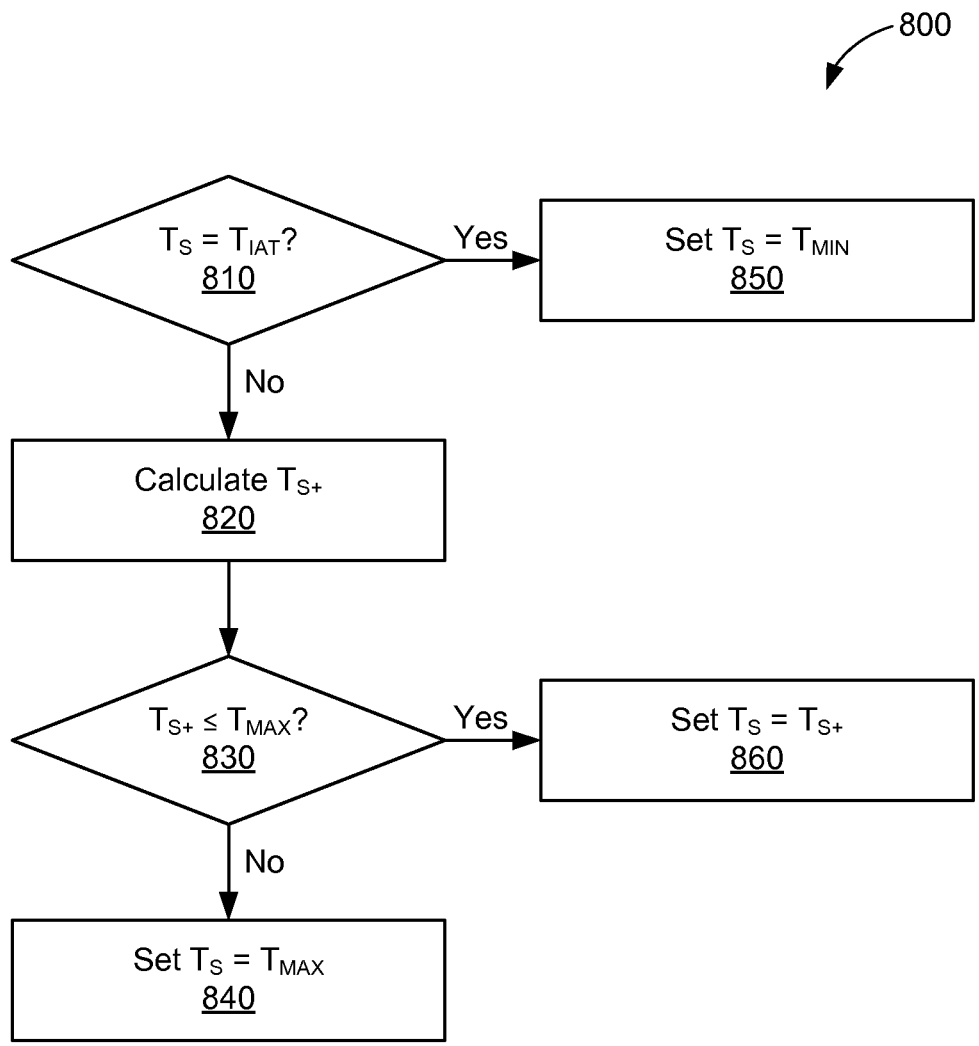
FIG. 8 is a flow chart illustrating another more detailed example of a power save operation in a STA.

FIG. 8 is a flow chart of illustrating an example of various aspects for adjusting the sleep state interval in a progressive power save operation. As discussed above, the method 800 may be invoked each time a STA enters and reenters a sleep state (e.g., step 760 of FIG. 7). The STA may first determine whether the sleep interval $T_S$ has been initially set to the burst data interarrival time $T_{IAT}$ (810). If the sleep interval $T_S$ is currently equal to the interarrival time $T_{IAT}$, then the sleep interval $T_S$ may be adjusted to a minimum sleep value $T_{MIN}$ (850). As discussed above, the minimum sleep value $T_{MIN}$ may correspond to a minimum amount of time needed to transition from the listen state to the sleep state, and back.

If the sleep interval $T_S$ is not currently equal to the interarrival time $T_{IAT}$, then the STA may calculate a new sleep interval $T_S$ to be applied (820). For some embodiments, the new sleep interval $T_{S+}$ is longer in duration than the current sleep interval $T_S$. For example, as discussed above, the new sleep interval $T_{S+}$ may be calculated by doubling the current sleep interval. Furthermore, the STA may take into account a beacon frame interval associated with the AP when calculating the new sleep interval $T_{S+}$, to ensure that the STA does not miss too many (or any) beacon frames.

The STA may then compare the new sleep interval $T_{S+}$ with the maximum sleep value $T_{MAX}$ (830). For example, the maximum sleep value $T_{MAX}$ may be a predetermined value that is less than the beacon frame interval to ensure that the STA is awake long enough to receive the beacon frames broadcast by the AP. If the new sleep interval $T_{S+}$ is less than or equal to the maximum sleep value $T_{MAX}$, then the current sleep interval $T_S$ may be set to the new sleep interval $T_{S+}$ (860). However, if the new sleep interval $T_{S+}$ is greater than the maximum sleep value $T_{MAX}$, then the current sleep interval $T_S$ may be instead set to the maximum sleep value $T_{MAX}$.

As described above, the various aspects of the PPS software module 356 as executed by the processor 340 progressively increase the sleep interval of the STA based on the idle time between the active exchange of data with the AP. The idle time may vary depending on a number of parameters, such as by way of example, the backhaul data rate and delay supported by the AP. Under some circumstances, the idle time may be too short to realize maximum power savings. For instance, if the STA is programmed for a 5 ms listen state interval, and the conditions are such that the data arrives at the STA with a 2 ms gap in between bursts, the STA cannot sleep at all because the data bursts are too close in time. In this case, the TPS software module 358 may be used to force the STA into a sleep state in a power efficient way.

The TPS software module 358 as executed by the processor 340 uses the estimated application data rate rather than the idle gap time to control the sleep interval of the STA. Specifically, the processor 354, in executing the TPS software module 358, may estimate the overall application data rate (ADR) by aggregating the data rate of all applications currently running on the STA (e.g., at the MAC-upper layer interface). The processor 340 may also estimate the wireless link goodput (WLG) based on the percentage of "useful data" throughput over a given period. These estimations may be based on the current physical layer data rate and the observed packet error rate. The processor 340 may then set the overall sleep duration for the STA (e.g., between beacon intervals) based on the ratio of the ADR and WLG values. By way of example, if the ADR is 6 Mbps and the WLG is 54 Mbps, the STA needs to be awake only 11% of the time to receive all the data. In this situation, the STA can remain in the sleep state for a large portion of time.

Figure 9:
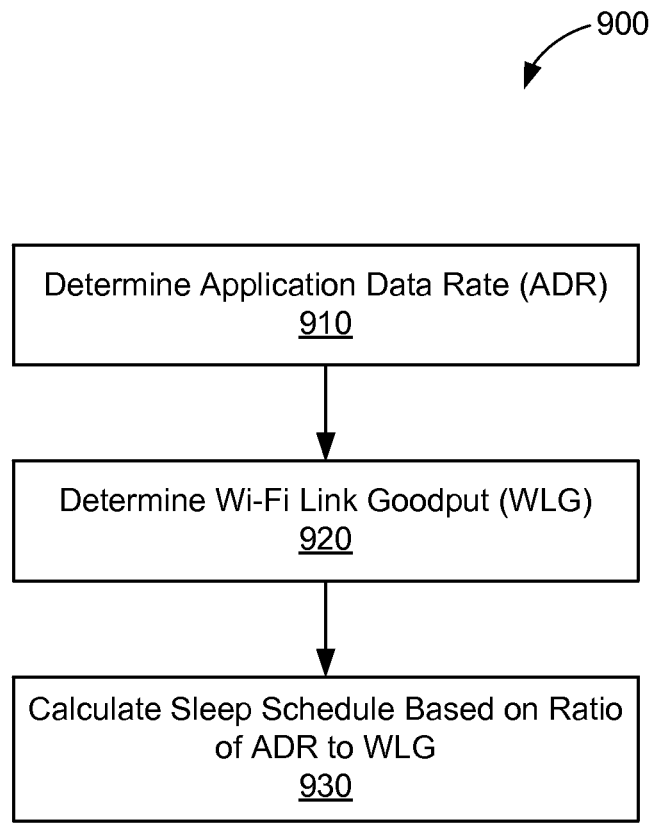
FIG. 9 is a flow chart illustrating an example of a throughput-based power save operation in a STA.

FIG. 9 is a flow chart illustrating an example of a throughput-based power save operation 900. A STA initiates the TPS operation 900 by first determining an overall application data rate (ADR) associated with the STA (910). For example, the STA may estimate the ADR value by monitoring the aggregate data usage of all applications currently running on the STA over a period of time. The STA then determines the goodput (WLG) of the wireless link (920). For example, the STA may estimate the WLG value by determining what percentage of throughput over a given period contains "useful data." Finally, the STA may calculate a sleep schedule based on a ratio of the ADR value and the WLG value. As discussed above, the STA may only need to be awake long enough to receive all of the data requested by one or more of its applications.

Figure 10A:
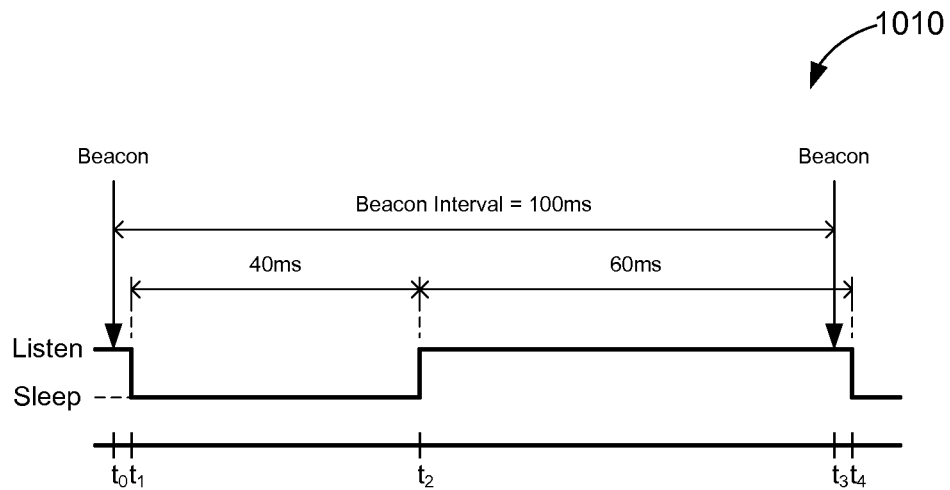
FIGS. 10A-10B are timing diagrams illustrating an example of a throughput-based power save operation in a STA.
Figure 10B:
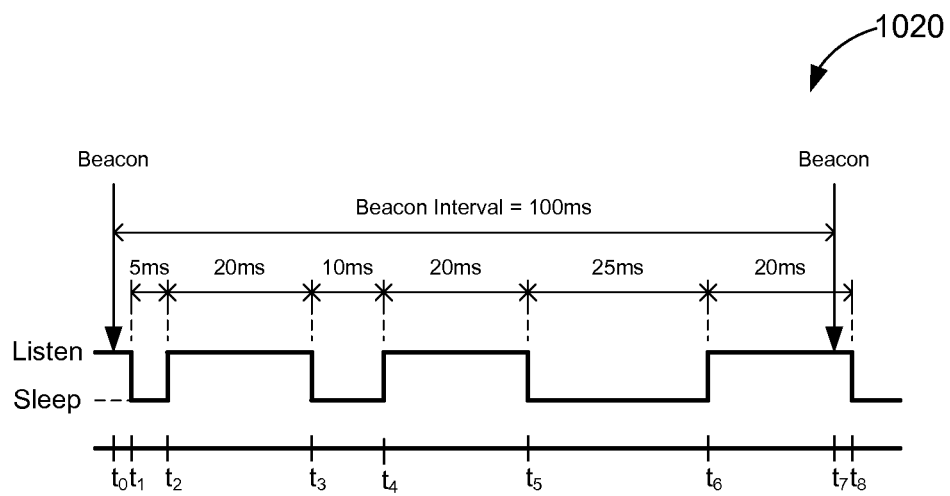

FIGS. 10A-10B are timing diagrams illustrating example of a throughput-based power save operations. Specifically, the TPS operations 1010 and 1020 depict two exemplary sleep schedules for the same ADR-WLG ratio. For example, a STA may have calculated the ADR-WLG ratio to be 40% (e.g., using the TPS operation 900 described above). Thus, for an exemplary beacon interval of 100 ms, the STA may remain asleep for 40% of the time, or 40 ms. In this manner, the STA may be awake for a total of 60 ms to receive any RX data. The overall sleep duration (e.g., 40 ms) may be distributed across the beacon interval in a number of ways (e.g., referred to herein as different sleep schedules). Although two particular sleep schedules 1010 and 1020 are described herein for exemplary purposes, various other sleep schedules may be contemplated using the TPS operation 900 described above.

FIG. 10A shows a first sleep schedule 1010, wherein the entire 40 ms sleep duration is allocated at the front end of the beacon interval. For example, upon receiving a beacon frame (at time $t_0$), the STA enters a sleep state (at time $t_1$) and remains in the sleep state for 40 ms (from times $t_1$-$t_2$). The STA then wakes up from the sleep state (at time $t_2$) to listen for potential RX data for the remaining 60 ms of the beacon interval (from times $t_2$-$t_3$).

FIG. 10B shows a second sleep schedule 1020, wherein the overall sleep duration is progressively applied throughout the entire beacon interval. For example, upon receiving a beacon frame (at time $t_0$), the STA enters a sleep state ($t_1$) and remains in the sleep state for a brief 5 ms duration (from times $t_1$-$t_2$). The STA then wakes up from the sleep state (at time $t_2$) to listen for potential RX data frames for a 20 ms duration (from times $t_2$-$t_3$), and returns to the sleep state (at time $t_3$). This time, the STA remains in the sleep state for 10 ms (from times $t_3$-$t_4$) before waking up once again to listen for RX data for another 20 ms duration (from times $t_4$-$t_5$). The STA will return to the sleep state (at time $t_5$) and remain asleep for 25 ms (from times $t_5$-$t_6$) before waking back up (at time $t_6$).

The sleep schedule can remain unchanged unless the ADR and/or WLG changes. In some embodiments, the actual duty cycle of the sleep state is selected to be slightly less than the actual ratio between the ADR and WLG, for example, 5% less. For instance, if the ADR to WLG ratio is 40%, the STA may forced into a sleep state for 35% of the time and awakened for 65% of the time. By doing so, the STA allows some additional time in the listen state in case the ADR begins to rise.

The software modules described thus far, when executed by a processor, optimizes the sleep interval of the STA based on downlink transmissions (i.e., transmissions from the AP to the STA). In the described embodiments that follow, various aspects will be presented that further optimize the sleep interval based on uplink transmissions (i.e., transmissions from the STA to the AP). In these embodiments, the STA may be configured to prevent or minimize uplink transmissions that might otherwise preempt the power savings benefits achievable with the PPS software module, TPS software module, or any other power savings method running in the STA for the purpose of optimizing the sleep state interval.

Figure 11:
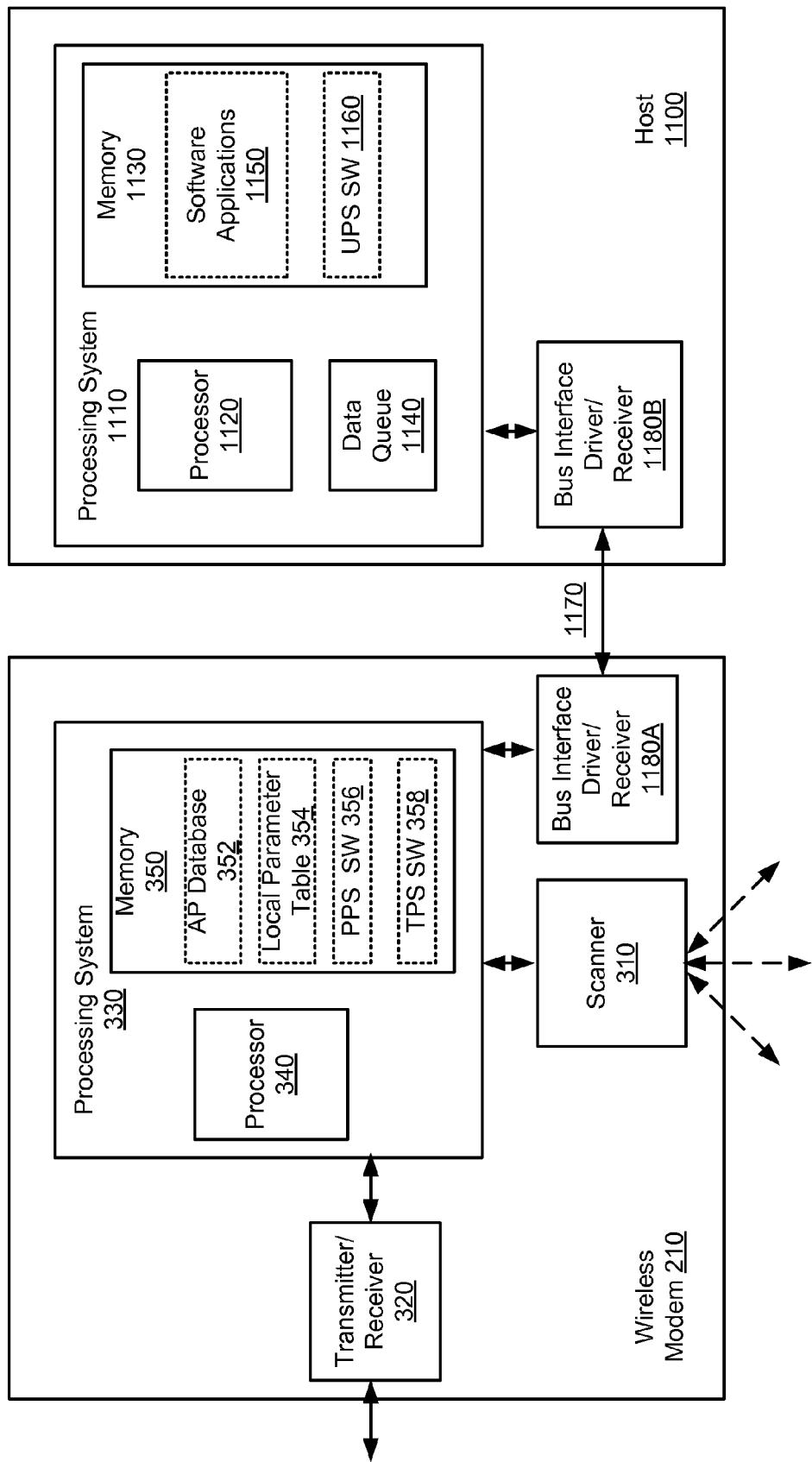
FIG. 11 is a block diagram illustrating an example of a wireless modem and a host in a STA.

FIG. 11 is a functional block diagram illustrating a detailed example of a STA 200. For brevity, the user interface is not shown. In this example, the wireless modem 210 has the same configuration as described earlier in connection with FIG. 3 with a scanner 310, transceiver 320 and processing system 330 that together provide or support a connection to a network through the AP. The host 220 is shown with a separate processing system 1110 that provides a means for executing a plurality of software applications. Similar to the processing system 330 in the wireless modem 210, the processing system 1110 in the host 220 may be implemented with a bus architecture which includes any number of interconnecting buses and bridges. The bus links together various circuits in the processing system 1110 including a processor 1120, memory 1130, and a data queue 1140. The bus may also link various other circuits such as timing sources, peripherals, voltage regulators, power management circuits, and the like, which are well known in the art, and therefore, will not be described any further.

The processor 1120 is responsible for managing the bus and general processing, including the execution of software stored in memory 1130. The memory 1130 may include a non-transitory computer-readable medium (e.g., one or more nonvolatile memory elements) which may include any number of software modules and/or software applications. Each software module and/or application includes a set of instructions that when executed by the processor 1120 cause the processing system 1130 to perform various functions. In this example, the non-transitory computer-readable medium is shown with software applications 1150 that enable the user to interact with the STA 200 through the user interface 230. The non-transitory computer-readable medium is also shown with an uplink power save (UPS) software module 1160 that provides a means for buffering uplink data during the sleep state for transmission following the sleep state. The non-transitory computer-readable medium may also include other software modules (not shown) that enable the processor 1120 manage the general operation of the host 220.

The STA 200 may also include an interface between the wireless modem 210 and the host 220 comprising a communication link 1700 (e.g., bus, signal path, cable, etc.) connected between two bus interface drivers/receivers 1180A and 1180B. The communication link 1170 may be used to send data and control signals between the wireless modem 210 and the host 220.

In the embodiment described thus far, the wireless modem 210 and the host 220 each have its own processing system dedicated to performing certain functions for the STA 200. However, the various functions of the STA 200 may be distributed differently between the two processing systems and/or other entities within the STA 200. Alternatively, the STA 200 may employ a single processing system that is shared between the wireless modem 210 and the host 220. Those skilled in the art will be readily able to determine the appropriate configuration and distribution of work within the STA based on the particular application and the overall design constraints imposed on the system.

The UPS software module 1160 when executed by the processor 1120 allows the STA 200 to remain in a sleep state for a longer duration while buffering uplink data generated by one or more software applications 1150, or by other means, for delayed transmission. As described above, the wireless modem 210 may determine the sleep schedule for the STA 200 based on a PPS and/or TPS algorithm. This sleep schedule, whether determined by a PPS algorithm, a TPS algorithm, or by other means, may be provided by the processor 340 in the wireless modem 210 to the processor 1120 in the host 220 via the communication link 1180. The sleep schedule may be provided periodically at some known time interval, or alternatively, right before the STA 200 goes to sleep.

Once the host 220 has knowledge of the sleep schedule, the UPS software module 1160 when executed by the processor 1120 can use the data queue 1140 to buffer uplink data while the STA is in the sleep state and provide the buffered data to the transceiver 320 in the wireless modem 210 for uplink transmission when the STA 200 awakes.

For some embodiments, the sleep schedule can be preempted by the UPS software module 1160 running on the processor 1120 based on some algorithm. By way of example, high priority data generated by the software applications 1150, such as voice or video, may be provided to the transceiver 320 without delay for transmission to ensure low end-to-end latency. Lower priority data, such as text, background data, and data requiring only best-effort transmissions can be buffered in the data queue 1140 by the UPS software module 1160 running on the processor 1120 until the scheduled awake time for the STA 200.

In other embodiments, even if the data is low priority, the sleep schedule may still be preempted by the UPS module 1160 running on the processor due to some traffic related criteria. By way of example, data related to the establishment of a network connection, such as an http request, TCP SYNCH, or TCP packets during the ramp up stage, may be provided to the transceiver 320 in the wireless modem 210 without delay in order to reduce the connection setup latency.

Alternatively, or in addition to the data buffering scheme just presented, the UPS software module 1160 when executed by the processor 1120 may provide the data being buffered in the sleep state to the transceiver 320 in the wireless modem 210 before the STA 200 is scheduled to wake up based on the overall buffering capability of the data queue 1140. By way of example, the buffered data may be provided to the transceiver 320 for immediate transmission if the buffering threshold of the data queue 1140 is reached before the STA 200 is scheduled to wake up.

The UPS software module 1160 when executed by the processor 1120 may also be configured to minimize air time as much as possible by attempting uplink transmissions when the bandwidth available is at its highest. By way of example, the UPS software module 1160 running on the processor 1120 may continue to buffer uplink data in the data queue 1140 during the scheduled sleep interval until prevailing channel conditions improve. The channel conditions may be determined by the scanner 310 in the wireless modem 210 from the receive signal strength indicator (RSSI) and/or the signal-to-noise ratio (SNR) of the periodic beacon transmitted by the AP. With better channel conditions, it is more likely that the wireless modem 210 will be able to use a higher modulation and coding scheme (MCS) to transmit the uplink data, thereby shortening the air time by eliminating decoding errors at the AP which necessitates retransmissions.

As another example, the UPS software module 1160 when executed by the processor 1120 may continue to buffer uplink data in the data queue 1140 during the scheduled sleep interval until the scanner 310 in the wireless modem 210 determines that the channel has high bandwidth capacity. By way of example, after every beacon is received, the scanner 310 may use a clear channel assessment (CSA) process to analyze the bandwidth of the available channels. If the highest bandwidth channels are available, the UPS software module 1160 running on the processor 1120 can preempt the sleep schedule and provide the buffered data from the data queue 1140 to the transceiver 320 in the wireless modem 210 for immediate transmission. This will tend to reduce the air time required for uplink transmissions to the AP.

Figure 12:
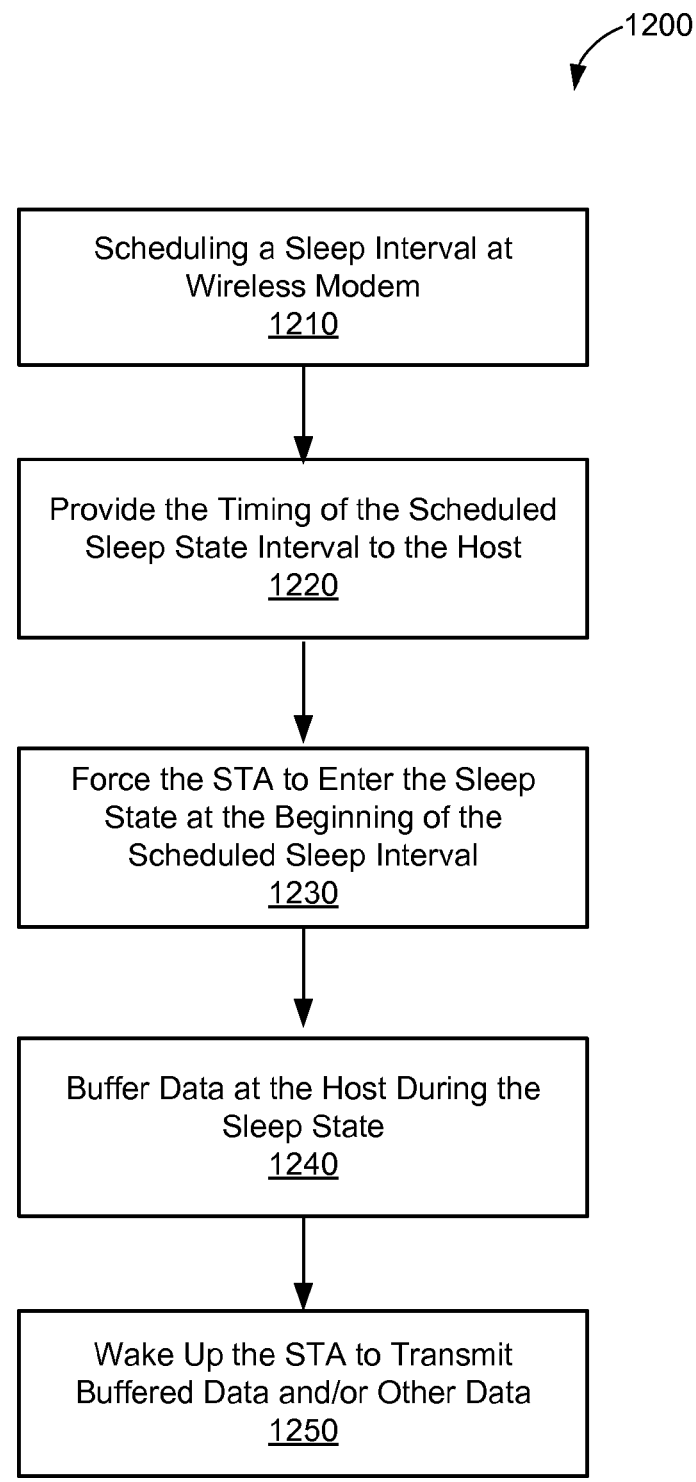
FIG. 12 is a flow chart illustrating an example of an uplink power save operation in a STA.

FIG. 12 is a flow chart illustrating an example of an uplink power save operation 1200. The operation (1200) begins by scheduling a sleep state interval (1210). The sleep state interval may be scheduled using the PPS or TPS algorithm running in the wireless modem as described above. Alternatively, the sleep schedule may be determined by other suitable means. The wireless modem may provide the timing of the scheduled sleep state sleep interval to the host (1220). The wireless modem may then force the STA to enter the sleep state at the beginning of the scheduled sleep interval (1230). Since the timing of the scheduled sleep state interval is known by the host, the host can buffer data in the data queue while the STA is asleep (1240). The wireless modem wakes up the STA from the sleep state, either at the end of the scheduled sleep state interval or before, to transmit the buffered data and/or other data generated by the host (1250).

Figure 13:
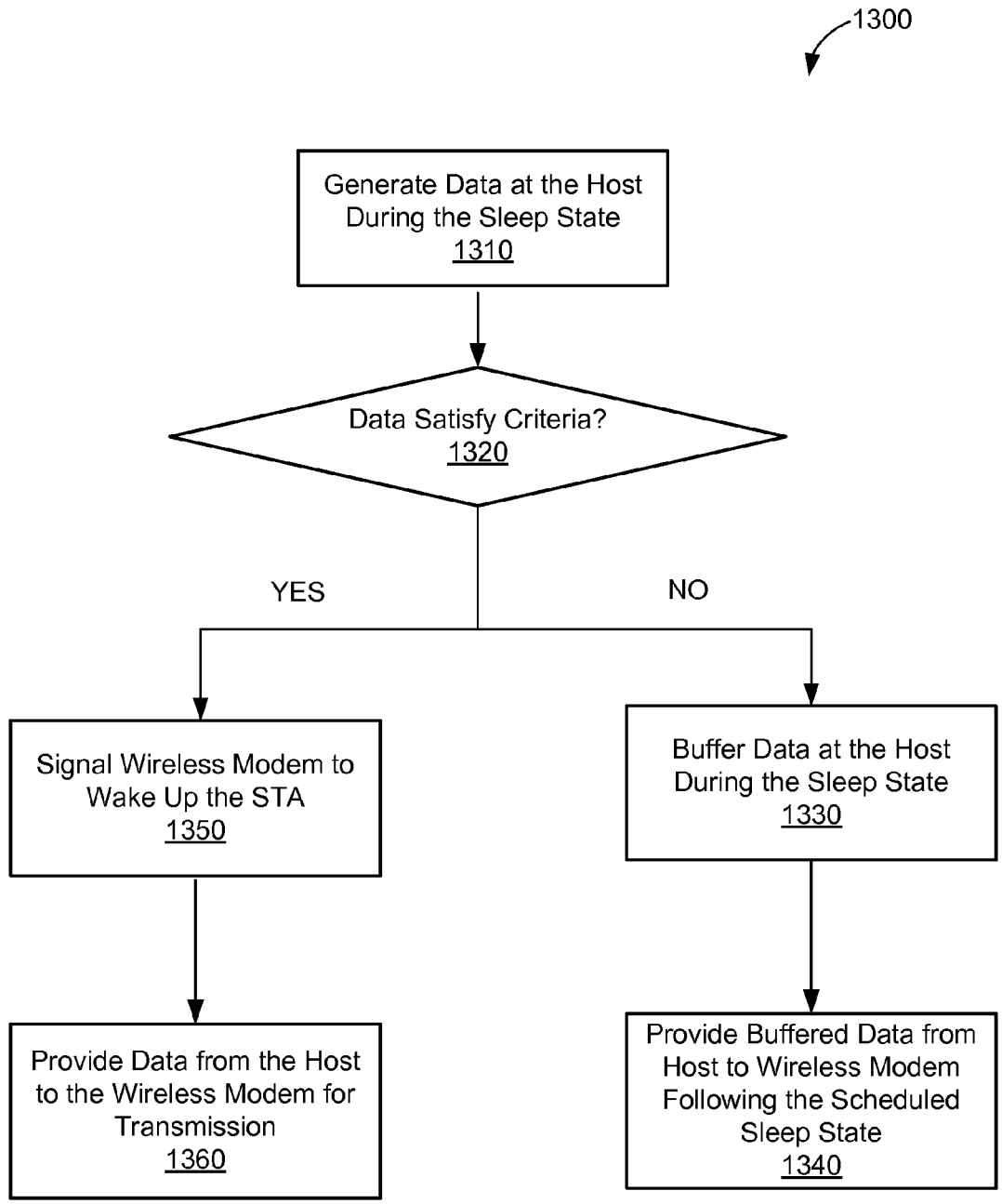
FIG. 13 is a flow chart illustrating a more detailed example of a data buffering process during an uplink power save operation in a STA.

FIG. 13 is a flow chart illustrating a more detailed example of various aspects of the data buffering process for the uplink power save operation (1300). As explained above in connection with FIG. 12, the operation begins by scheduling a sleep state interval using the PPS or TPS algorithm running in the wireless modem, or by some other suitable means. The wireless modem may the timing of the scheduled sleep state sleep interval to the host. The wireless modem may then force the STA to enter the sleep state at the beginning of the scheduled sleep interval.

During the sleep state, the host generates data to be transmitted (1310). The data may be evaluated by the host to determine whether it satisfies certain criteria (1320). The criteria may be any suitable criteria. By way of example, high priority data such as voice, video, and the like may be provided to the wireless modem for immediate transmission, whereas low priority data such as text, background data, data requiring best-effort delivery, and the like may be buffered at the host. Alternatively, or in addition to, data for establishing a network connection such as an http request, TCP SYNCH, or TCP packets during the ramp up stage, may be transmitted without delay. Similarly, data belonging to a high priority application running in the host may also be transmitted without delay.

If the data does not satisfy the criteria, the host may buffer the data while the STA remains in the sleep state 1330. The host may provide the buffered data to the wireless modem for transmission 1340 when the STA wakes up following the scheduled sleep state. Any data generated by the host that satisfies the criteria in 1320 may be queued up for immediate transmission. In that case, the host signals the wireless modem to wake up the STA before the end of the scheduled sleep state (1350) and provides the data to the wireless modem for transmission (1360). In some embodiments, the buffered data may also be transmitted once the STA wakes. In other embodiments, the buffered data remains in the data queue for later transmission.

Figure 14:
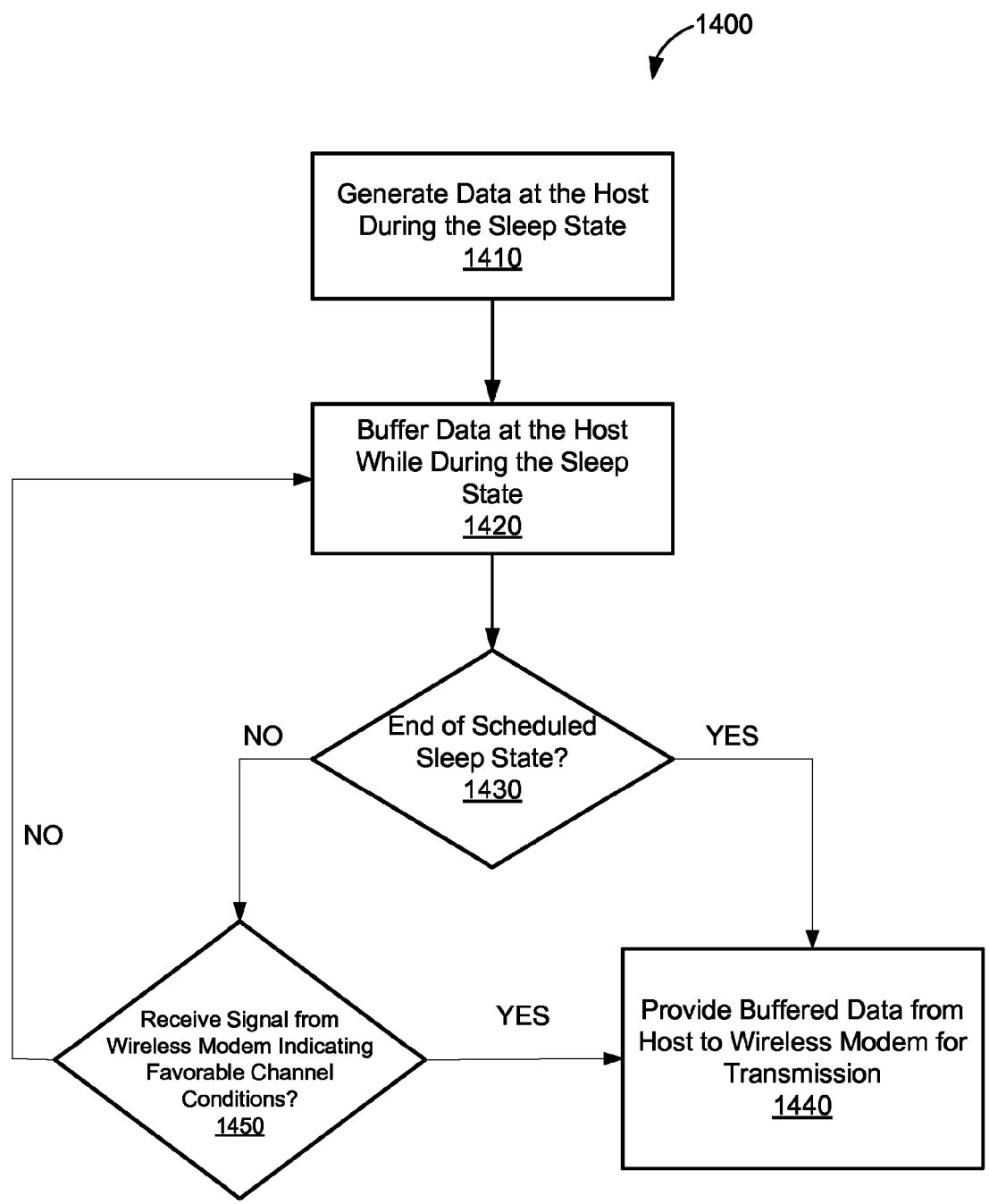
FIG. 14 is a flow chart illustrating another more detailed example of a data buffering process during an uplink power save operation in a STA.

FIG. 14 is a flow chart illustrating a more detailed example of various aspects of the data buffering process for the uplink power save operation 1400 As explained above in connection with FIG. 12, the operation begins by scheduling a sleep state interval using the PPS or TPS algorithm running in the wireless modem, or by some other suitable means. The wireless modem may relay the timing of the scheduled sleep state sleep interval to the host. The wireless modem may then force the STA to enter the sleep state at the beginning of the scheduled sleep interval.

During the sleep state, the host generates data to be transmitted (1410). The data may be buffered in the data queue by the host during the sleep state (1420). When the scheduled sleep state ends (1430), the host provides the buffered data to the wireless modem for transmission (1440). However, in this example, the STA may be woken early from the sleep state when the channel conditions are favorable for transmission. Specifically, the wireless modem may evaluate the channel conditions, and if the channel conditions are favorable, the wireless modem may signal the host to release the buffered data from the data queue (1450). In response, the host provides the buffered data to the wireless modem (1440) for immediate transmission. As described in more detail above, the channel conditions evaluated by the wireless modem may include, by way of example, a quality metric such as the RSSI or SNR which can be determined by the wireless modem from the beacon frames transmitted by the AP. Alternatively, or in addition to, the channel conditions evaluated by the wireless modem may include the available bandwidth of the wireless channel. Those skilled in the art will be well suited for determining the appropriate channel conditions for the host to wake from the scheduled sleep state based on the particular application.

The various aspects of this disclosure are provided to enable one of ordinary skill in the art to practice the present invention. Various modifications to exemplary embodiments presented throughout this disclosure will be readily apparent to those skilled in the art, and the concepts disclosed herein may be extended to other magnetic storage devices. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112 (f), unless the element is expressly recited using the phrase "means for" or, in the case of a method claim, the element is recited using the phrase "step for."

What is claimed is:

1. An apparatus for accessing a network through a wireless access point, comprising:
a processing system configured to:
schedule a sleep state interval;
enter a sleep state at the beginning of the scheduled sleep interval;
buffer data during the sleep state for transmission following the sleep state;
identify data other than the data buffered for transmission; and
determine if the other data is to be transmitted before the end of the scheduled sleep interval.

2. The apparatus of claim 1 wherein the processing system is further configured to wake up from the sleep state at the end of the scheduled sleep state interval.

3. The apparatus of claim 1 wherein the processing system is further configured to wake up from the sleep state before the end of the scheduled sleep interval.

4. The apparatus of claim 3 wherein the other data comprises at least one from the group consisting of voice and video.

5. The apparatus of claim 3 wherein the other data comprises data for establishing a network connection.

6. The apparatus of claim 3 wherein the other data comprises data belonging to an application running in the processing system.

7. The apparatus of claim 1 wherein the processing system is further configured to wake up from the sleep state before the end of the scheduled sleep interval to transmit at least a portion of the buffered data.

8. The apparatus of claim 7 wherein the processing system is further configured to wake up from the sleep state when a quality metric for the transmission channel exceeds a threshold.

9. The apparatus of claim 7 wherein the processing system is further configured to wake up from the sleep state when the bandwidth of an available transmission channel exceeds a threshold.

10. The apparatus of claim 1 wherein the processing system comprises a host and wireless modem, wherein the wireless modem is configured to schedule the sleep interval and communicate the schedule to the host, and wherein the host comprises a data queue configured to buffer the data during the sleep state.

11. The apparatus of claim 10 wherein the processing system is further configured to wake up from the sleep state at the end of the sleep state interval, and wherein the host is further configured to provide at least a portion of the buffered data from the data queue to the wireless modem for transmission.

12. The apparatus of claim 10 wherein the host is further configured to wake up the processing system before the end of the scheduled sleep interval and provide at least one of other data to be transmitted before the end of the scheduled sleep interval and at least a portion of the buffered data from the data queue to the wireless modem for transmission.

13. The apparatus of claim 1 wherein the processing system further comprises a data queue for buffering the data, and wherein the processing system is further configured to wake up from the sleep state when the data queue is filled above a specified threshold.

14. An apparatus for accessing a network through a wireless access point, comprising:
means for scheduling a sleep state interval;
means for entering a sleep state at the beginning of the scheduled sleep interval; and
means for buffering data during the sleep state for transmission following the sleep state;
means for identifying data other than the data buffered for transmission; and
means for determining if the other data is to be transmitted before the end of the scheduled sleep interval.

15. The apparatus of claim 14 further comprising means for waking up from the sleep state at the end of the scheduled sleep state interval.

16. The apparatus of claim 14 further comprising means for waking up from the sleep state before the end of the scheduled sleep interval.

17. The apparatus of claim 14 wherein the other data comprises at least one from the group consisting of voice and video.

18. The apparatus of claim 14 wherein the other data comprises data for establishing a network connection.

19. The apparatus of claim 14 wherein the other data comprises data belonging to an application running in the processing system.

20. The apparatus of claim 14 further comprising means for waking up from the sleep state before the end of the scheduled sleep interval to transmit at least a portion of the buffered data.

21. The apparatus of claim 20 wherein the means for waking up from the sleep state is configured to wake up from the sleep state when a quality metric for the transmission channel exceeds a threshold.

22. The apparatus of claim 20 wherein the means for waking up from the sleep state is configured to wake up from the sleep state when the bandwidth of an available transmission channel exceeds a threshold.

23. The apparatus of claim 14 further comprising a data queue for buffering the data, and wherein the means for waking up from the sleep state is configured to wake up from the sleep state when the data queue is filled above a specific threshold.

24. A method of power savings for an apparatus configured to access a network through a wireless access point, comprising:
scheduling a sleep state interval;
entering a sleep state at the beginning of the scheduled sleep interval;
buffering data during the sleep state for transmission following the sleep state;
identifying data other than the data buffered for transmission; and
determining if the other data is to be transmitted before the end of the scheduled sleep interval.

25. The method of claim 24 further comprising waking up from the sleep state at the end of the scheduled sleep state interval.

26. The method of claim 24 further comprising waking up from the sleep state before the end of the scheduled sleep interval.

27. The method of claim 24 wherein the other data comprises at least one from the group consisting of voice and video.

28. The method of claim 24 wherein the other data comprises data for establishing a network connection.

29. The method of claim 24 wherein the other data comprises data belonging to an application running in the processing system.

30. The method of claim 24 further comprising waking up from the sleep state before the end of the scheduled sleep interval to transmit at least a portion of the buffered data.

31. The method of claim 30 wherein the waking up from the sleep state comprises waking up from the sleep state when a quality metric for the transmission channel exceeds a threshold.

32. The method of claim 30 wherein the waking up from the sleep state comprises waking up from the sleep state when the bandwidth of an available transmission channel exceeds a threshold.

33. The method of claim 24 wherein the data is buffered in a data queue, and wherein the waking up from the sleep state comprises waking up from the sleep state when the data queue is filled above a specific threshold.

34. A computer program product for an apparatus configured to access a network through a wireless access point, comprising:
 a non-transitory computer-readable medium comprising code executable by one or more processors for:
 scheduling a sleep state interval;
 entering a sleep state at the beginning of the scheduled sleep interval;
 buffering data during the sleep state for transmission following the sleep state;
 identifying data other than the data buffered for transmission; and
 determining if the other data is to be transmitted before the end of the scheduled sleep interval.

35. The computer program product of claim 34 further comprising code executable by one or more processors for waking up from the sleep state at the end of the scheduled sleep state interval.

36. The computer program product of claim 34 further comprising waking up from the sleep state before the end of the scheduled sleep interval.

37. The computer program product of claim 34 wherein the other data comprises at least one from the group consisting of voice and video.

38. The computer program product of claim 34 wherein the other data comprises data for establishing a network connection.

39. The computer program product of claim 34 wherein the other data comprises data belonging to an application running in the processing system.

40. The computer program product of claim 34 further comprising code executable by one or more processors for waking up from the sleep state before the end of the scheduled sleep interval to transmit at least a portion of the buffered data.

41. The computer program product of claim 40 wherein the code for waking up from the sleep state comprises code for waking up from the sleep state when a quality metric for the transmission channel exceeds a threshold.

42. The computer program product of claim 40 wherein the code for waking up from the sleep state comprises code for waking up from the sleep state when the bandwidth of an available transmission channel exceeds a threshold.

43. The computer program product of claim 34 wherein the data is buffered in a data queue, and wherein the code for waking up from the sleep state comprises code for waking up from the sleep state when the data queue is filled above a specific threshold.

\* \* \* \* \*